US005188546A

United States Patent [19]

Ballard et al.

[11] Patent Number: 5,188,546

[45] Date of Patent: Feb. 23, 1993

[54] CONTINUOUS CARRIER WEB MEMBER AND METHOD OF FABRICATING SHEET METAL COMPONENTS FOR ELECTRICAL CONNECTORS

[75] Inventors: Kenneth D. Ballard, Wheaton, Ill.; Ronald E. Bottino, Bristol; Mark K. Labbe, Burlington, both of Conn.; John E. Lopata, Naperville, Ill.; Tom Malinski, Terryville, Conn.; Wilhelm Meier, Manchester, Conn.; Lou Morelli, Terryville, Conn.; Michael G. Pacyga, Downers Grove, Ill.; Mitch Primorac, Chicago, Ill.; Bernardus Roodnat, Winfield, Ill.; Shawn Simpson, Unionville, Conn.

[73] Assignee: Molex Incorporated, Lisle, Ill.

[21] Appl. No.: 841,927

[22] Filed: Feb. 25, 1992

[51] Int. Cl.[5] .......... H02R 3/00

[52] U.S. Cl. .......... 439/885; 29/414; 29/874; 29/882; 29/884; 72/379.2

[58] Field of Search .......... 29/412, 414, 417, 418, 29/874, 882, 884; 72/379.2, 379.6, 405; 439/885

[56] References Cited

U.S. PATENT DOCUMENTS 4,377,321 3/1983 Weisenburger .......... 439/885
5,078,617 1/1992 Gutierrez et al. .......... 439/422

*Primary Examiner*—Gary F. Paumen
*Attorney, Agent, or Firm*—Charles S. Cohen

[57] ABSTRACT

A carrier web of sheet metal material joining stamped and formed components of an electrical connector is disclosed. The component is carried through the stamping and forming process by the carrier web of the sheet metal material. The component is stamped and formed from the material such that at least a portion of the component projects from one side of the original plane of the sheet metal material. The carrier web is formed into a three-dimensional configuration to reduce the spacing between adjacent components. A portion of the web may project a sufficient distance from the one side of the original plane of the sheet metal material to protect the projecting portion of the component during subsequent manufacturing operations on the component. A retaining structure may also be provided to retain the components at a predetermined spacing on the carrier web. A method of manufacturing the carrier web is also disclosed.

30 Claims, 6 Drawing Sheets

FIG.3
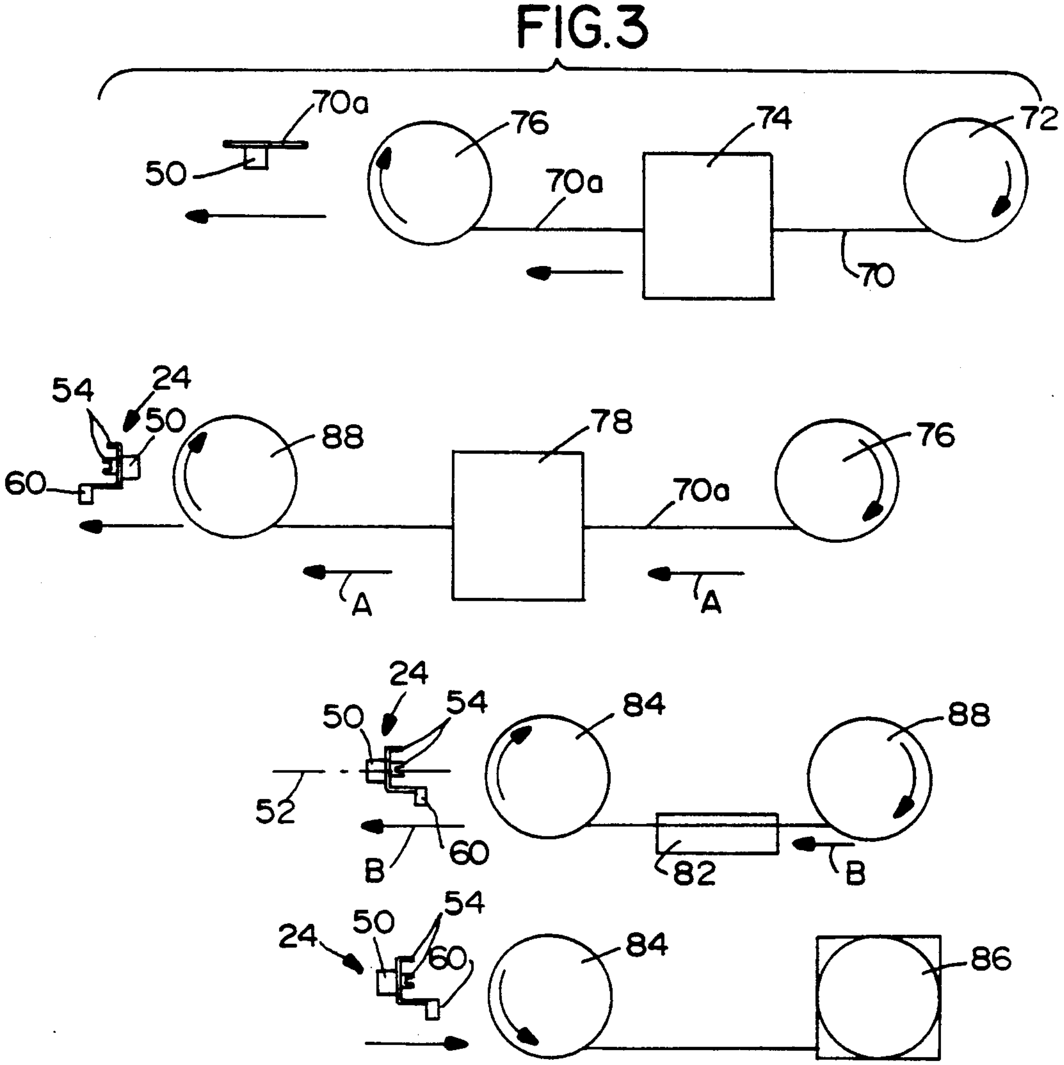
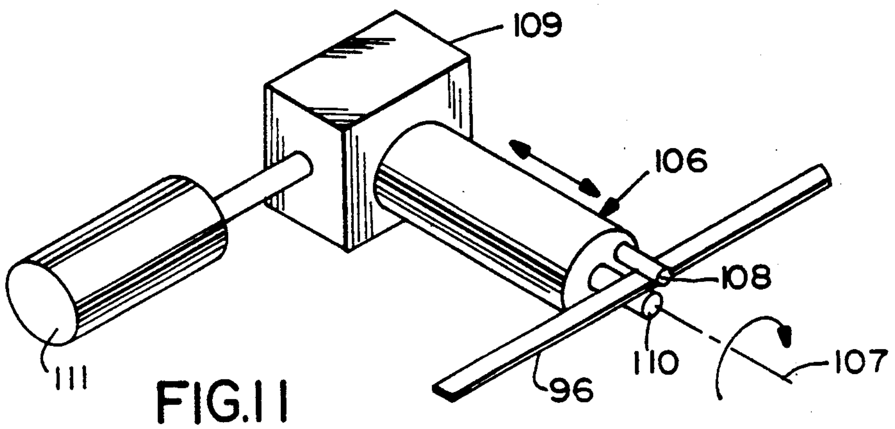
FIG.11

CONTINUOUS CARRIER WEB MEMBER AND METHOD OF FABRICATING SHEET METAL COMPONENTS FOR ELECTRICAL CONNECTORS

FIELD OF THE INVENTION

This invention generally relates to the art of electrical connectors and, particularly, to the carrier strip joining stamped and formed sheet metal material components for electrical connectors and a method of making same.

BACKGROUND OF THE INVENTION

Various components of electrical connectors are fabricated of sheet metal material, as in a continuous stamping and forming operation. Terminals or contacts and EMI/RFI shields are examples. As is conventional in stamping and forming operations, the components are carried through the stamping and forming stations by integral carrier means of the sheet metal material, such as a pair of generally spaced carrier strips, with the components being stamped and formed between the strips. The carrier strips or webs are often provided with spaced apertures whereby the webs not only carry the components through the various stamping and forming operations but the webs are used for indexing purposes in the various operational machines.

As is known, once the components are stamped and formed in their final configurations, they can be removed from the carrier strips and plated (e.g., barrel plated) or they can remain attached or integral with the carrier webs and the composite strips are wound onto reels for subsequent processing, such as plating operations, or for subsequent assembly of the components into electrical connector assemblies. In the alternative, the components can be partially formed, plated and then formed to their desired final configuration.

Various problems are encountered in fabrication techniques as described above. One of the problems involves damage to the components during handling and processing after the stamping and forming operations, during or after the composite strips being wound onto reels. For instance, a shield for a conventional input/output (I/O) electrical connector may include a base plate with various portions projecting therefrom. Grounding legs and tabs may be integrally formed and project from the base plate for insertion into grounding holes in a printed circuit board. Locking tabs may project from the base plate for locking the plate to a housing or other component of the electrical connector. The shroud of the shield also projects from the base plate. These portions may and typically do project in different directions.

Each of these projections is susceptible to being damaged, bent or tangled as the separated or individual components are plated in a barrel plating operation. They also are prone to being damaged during winding of the shields (extending between parallel carrier webs) onto reels, during subsequent fabricating processes such as plating when the composite strip is unwound from the reel and again wound back on the reel, and during subsequent assembly operations prior to or during assembly of the shield on the connector housing. Methods of protecting the projecting portions of the shield are therefore a significant issue because minimizing damaged parts reduces scrapped parts.

Protection of relatively fragile components is further an issue because in the past, shields were typically formed with the access of the open-ended shroud portion of the shell oriented perpendicular to the plane of the carrier web. If the shells are plated while on the carrier web, the entire shell and carrier web composite is submerged and moved through the plating bath. Because of the orientation of the shroud relative to the direction of travel of the carrier web composite, non-uniform plating may occur since: 1) the distance between the anode and the outer surface of the shell varies which causes the center of the outer surface to receive the least amount of plating; 2) adjacent shells shield each other from the current; and 3) the plating fluids do not uniformly flow through and around the shroud opening. In addition, such an orientation of a shell that includes integral ground tabs oriented perpendicular to the shroud axis does not readily permit selective plating of the ground tabs only, with a different metal or a different thickness of plating.

Rotation of the shell so that the plane of the flange from which an (i.e., an axis through the shroud opening is parallel to the plane of the carrier web) the open-ended shroud portion extends is perpendicular the plane of the carrier web permits the plating fluids to more evenly flow through the shroud which results in more uniform plating. The ground tabs then project beneath the carrier web and the shroud portion of the shell which readily permits selective plating of only the ground tab as referred to above. However, since the tabs project perpendicularly relative to the direction of movement of the carrier web, they are prone to becoming damaged during reeling and handling operations. Protection of these tabs is thus desirable.

If the components are partially formed and then plated, the plating may crack during subsequent forming operations. This is especially important for the manufacture of shields for connectors because the shield connects the electrical connector to a ground circuit. Because the plating such as nickel applied to a steel shield is a better conductor than the steel shield itself, cracks in the plating interrupt the ground path which decreases the shielding effectiveness of the shield and thus its EMI/RFI performance. Another problem is possible corrosion of the base metal of the shield due to exposure caused by cracks in the plating.

A further problem in stamping and forming such components involves the undue longitudinal spacing between the components, lengthwise relative to the carrier webs. That is, taking the I/O shield again as an example, considerable sheet metal material is required to produce the shield into its ultimate configuration. Once formed, relatively large spacings or gaps result between the centers of adjacent shields lengthwise relative to the carrier webs. This results in the wound composite reels being of undue size or diameter or permits a relatively few number of parts per reel.

It is known that U-shaped corrugations can be formed in the portion of the carrier webs between adjacent metal components in order to reduce the spacing between such metal components and thus permit a greater number of components on a reel of a given diameter. Such corrugations are typically formed in a multi-station forming operation which results in additional complexity for the forming die. The forming operation utilized to create the U-shape involves a manufacturing trade-off in that the fewer stations utilized to form the U-shape, the greater the likelihood that the metal will stretch and become thinner during the forming process. In addition, such stretching is likely to not be uniform which would result in inconsistent spacing between components from production run to production run due to slight changes in the material thickness and mechanical properties. This makes subsequent automated handling and assembly more difficult.

Another problem with the U-shape is that during a process such as plating, the shells and their connecting carrier webs or strips are unreeled and run through a plating bath and then re-reeled. The distance between the supply reel and the take-up reel is typically between 40 and 120 feet. Due to the weight of the shells and the carrier webs, the flexibility of the metal carrier strip and the unsupported length between the reels, the U-shaped portions utilized to reduce the spacing between the shells will deform or stretch so that the two legs of the U-shaped member are no longer generally parallel. This will increase the spacing between adjacent shells and thus reduce the effectiveness of the space reduction. In addition, because the U-shaped portions will not stretch uniformly, the spacing between adjacent shells will be somewhat inconsistent which makes subsequent automated handling of the shells and assembly of the connector more difficult.

This invention is directed to solving the above problems and satisfying the stated needs.

SUMMARY OF THE INVENTION

An object, therefore, of the invention is to provide a new and improved continuous carrier web between components for an electrical connector stamped and formed from sheet metal material, the components being carried through the stamping and forming process by the continuous web of the sheet metal material. A method of manufacturing such carrier web is also disclosed.

In the exemplary embodiment of the invention, a portion of the carrier web connecting the components is formed, either during or after the stamping and forming of the component, into a three-dimensional configuration to reduce the spacing on the carrier web between adjacent components. This three-dimensional configuration may be dimensioned to protect projecting portions of the component during subsequent manufacturing operations on the component. In addition, a latching structure may be formed to retain the components at a predetermined spacing.

As disclosed herein, the illustrated stamped and formed component is a shield for a shielded electrical connector. The shield has at least one ground tab projecting from one side of the original plane of the sheet metal material and a mating portion projecting from the other side of the original plane of the sheet metal material.

With the above structure and method, and taking the shield in particular, the axis of the open-ended mating portion of the shield can extend in the direction of movement of the web to effect uniform plating through the mating portion, and the grounding tabs may project transverse to the axis of the mating portion for subsequent selective plating, with less of a risk of damaging these projecting portions of the shield, due to the web being configured to protect the projecting portions.

In addition, by forming the web into a three-dimensional configuration, the length of the web is effectively shortened, reducing the spacing between the stamped and formed components, and resulting in more components on the reel onto which the composite web and stamped and formed components are wound.

Consequently, the invention contemplates a unique web, and a composite wound reel of stamped and formed electrical components, for use in fabricating stamped and formed components for electrical connectors and the like.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 3 is a diagrammatical illustration of some of the steps involved in fabricating and processing a shield as shown in FIGS. 1 and 2;

FIG. 11 is a somewhat diagrammatical illustration of a portion of the tooling utilized in fabricating the embodiment illustrated in FIGS. 7–10.

DETAILED DESCRIPTION OF THE PREFERRED EMBODIMENT

Figure 1:
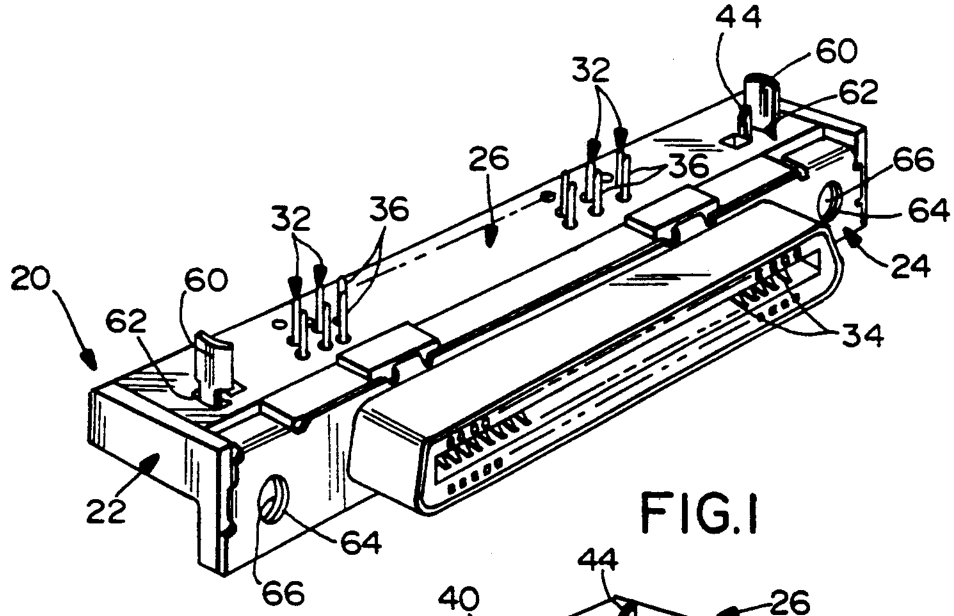
FIG. 1 is a perspective view of an I/O electrical connector having a stamped and formed shield which may be fabricated utilizing the carrier strip and according to the method of the invention.

Before referring to the drawings in detail, it should be understood that while the invention is illustrated and described herein in conjunction with fabricating a shield for a D-shaped electrical connector, the invention is equally applicable for stamping and forming from sheet metal material various other components to which the invention is advantageous.

Figure 2:
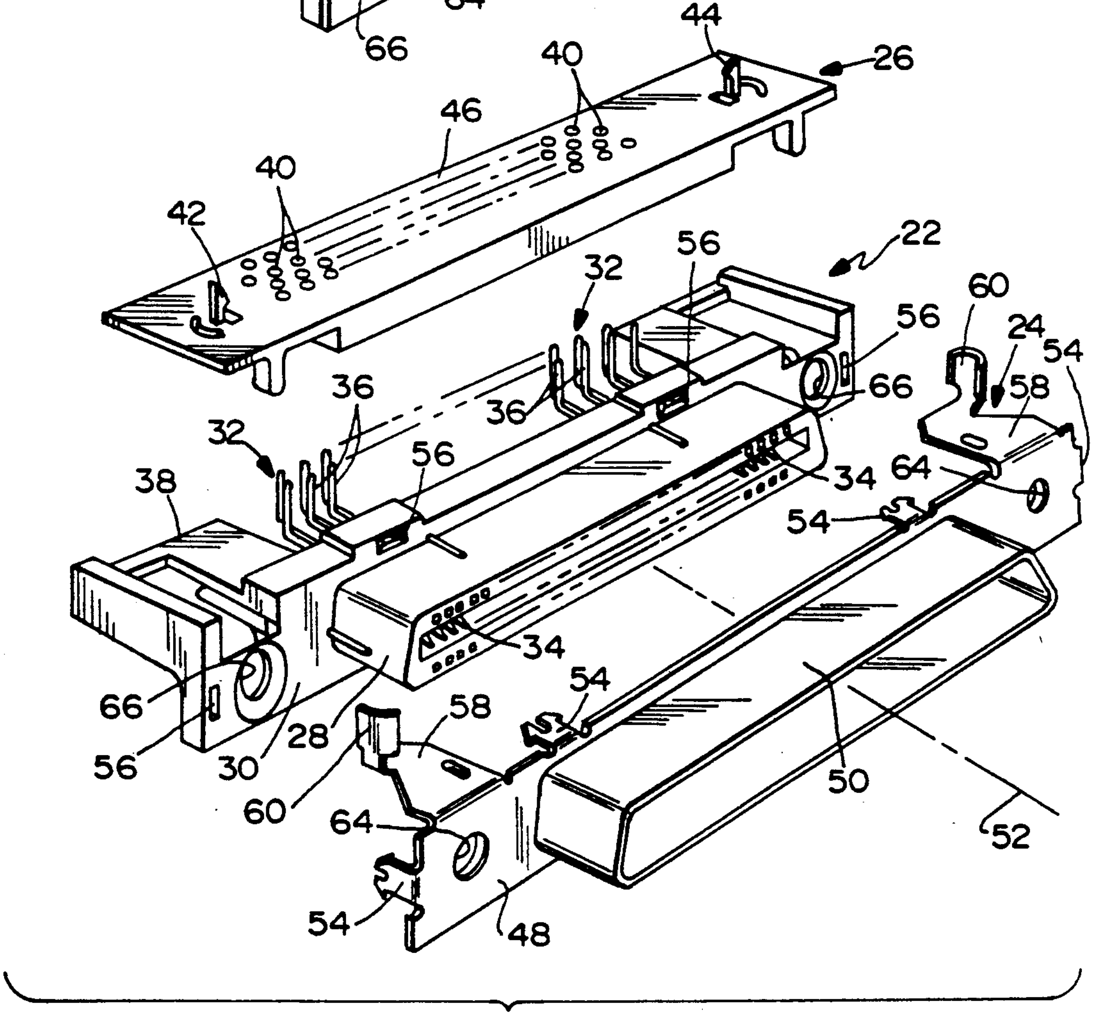
FIG. 2 is an exploded perspective view of various components of the connector of FIG. 1 to illustrate the three-dimensional configuration of the stamped and formed shield.

With that understanding, referring first to FIGS. 1 and 2, an electrical connector which is adapted to be mounted on a printed circuit board (not shown) is generally designated 20. The electrical connector includes a dielectric housing, generally designated 22, a front conductive shield, generally designated 24, and a tail aligner, generally designated 26. Connector housing 22 has a front mating portion 28 projecting outwardly from a front face 30. A plurality of right-angle terminals, generally designated 32, are disposed in the housing. The terminals have female mating end portions 34 disposed in front mating portion 28 and tail portions 36 projecting from a bottom face 38 (FIG. 2) of the connector housing. The tail portions of the terminals are adapted to be inserted into holes in the printed circuit board on which the electrical connector is to be mounted, such that bottom face 38 of the connector housing will be positioned adjacent the printed circuit board, with front mating face 30 disposed at generally a right-angle with respect to the plane of the printed circuit board.

Shield 24 is configured to be positioned about mating portion 28 of housing 22 and over front face 30 of the housing when the shield is affixed to the housing. On the other hand, tail aligner 26 is adapted to be mounted along bottom face 38 of the connector housing. When the tail aligner is so mounted, tail portions 36 of terminals 32 extend through an array of holes 40 (FIG. 2) in the tail aligner so that the tail portions are supported by the tail aligner until inserted into and soldered in holes in the printed circuit board. The tail aligner also includes mounting tabs 42 and 44 that extend from a bottom surface 46 of the tail aligner. The mounting tabs are adapted to fit into holes in the printed circuit board in order to maintain the electrical connector positioned on the printed circuit board until tail portions 36 of the terminals and ground lugs 60 are soldered to the printed circuit board.

Shield 24 is stamped and formed from conductive sheet metal material such as an aluminum killed steel and includes a base sheet or plate 48 from which projects a shield mating portion or shroud 50 which is open-ended in the direction of axis 52. The mating portion has a trapezoidal or D-shape corresponding to the shape of mating portion 28 of connector housing 22. Consequently, the shield may be slid into position onto the housing such that the shield mating portion 50 is disposed about mating portion 28. The shield also includes barbed locking tabs 54 for insertion into corresponding apertures 56 in housing 22 to lock the shield to the housing. The shield further includes a pair of grounding straps 58 projecting generally parallel to axis 52 of mating portion 50, but from the opposite side of plate 48 from the mating portion, and the grounding straps include ground tabs 60 projecting from the grounding straps generally perpendicular to axis 52. As seen in FIG. 1, ground tabs 60 project through apertures 62 in tail aligner 26 whereby the ground tabs can be inserted into holes in the printed circuit board and soldered to ground circuits on the board. Lastly, holes 64 are tapped into flange 48 of the shield for alignment with holes 66 in housing 22 for receiving appropriate fastening means of a complementary mating connector (not shown).

The above description of electrical connector 20 in FIGS. 1 and 2 has been given in order to show the configuration of a stamped and formed sheet metal component, namely shield 24, which might be used in an electrical connector. Using axis 52 of mating or shroud portion 50 of the shield as a frame of reference, it can be seen that the mating portion is open-ended in the direction of the axis, but flange 48 of the shield extends transverse to the axis. Grounding straps 58 extend generally parallel to the axis, but ground tabs 60 project perpendicular to the axis. The ground tabs are prone to becoming bent or damaged during various fabricating processes of the stamped and formed shield. It will be seen hereinafter that axis 52 defines the direction of movement of carrier webs in the stamping and forming operation of the shield as well as during various plating operations on the shield.

Figures 4, 5, 6:
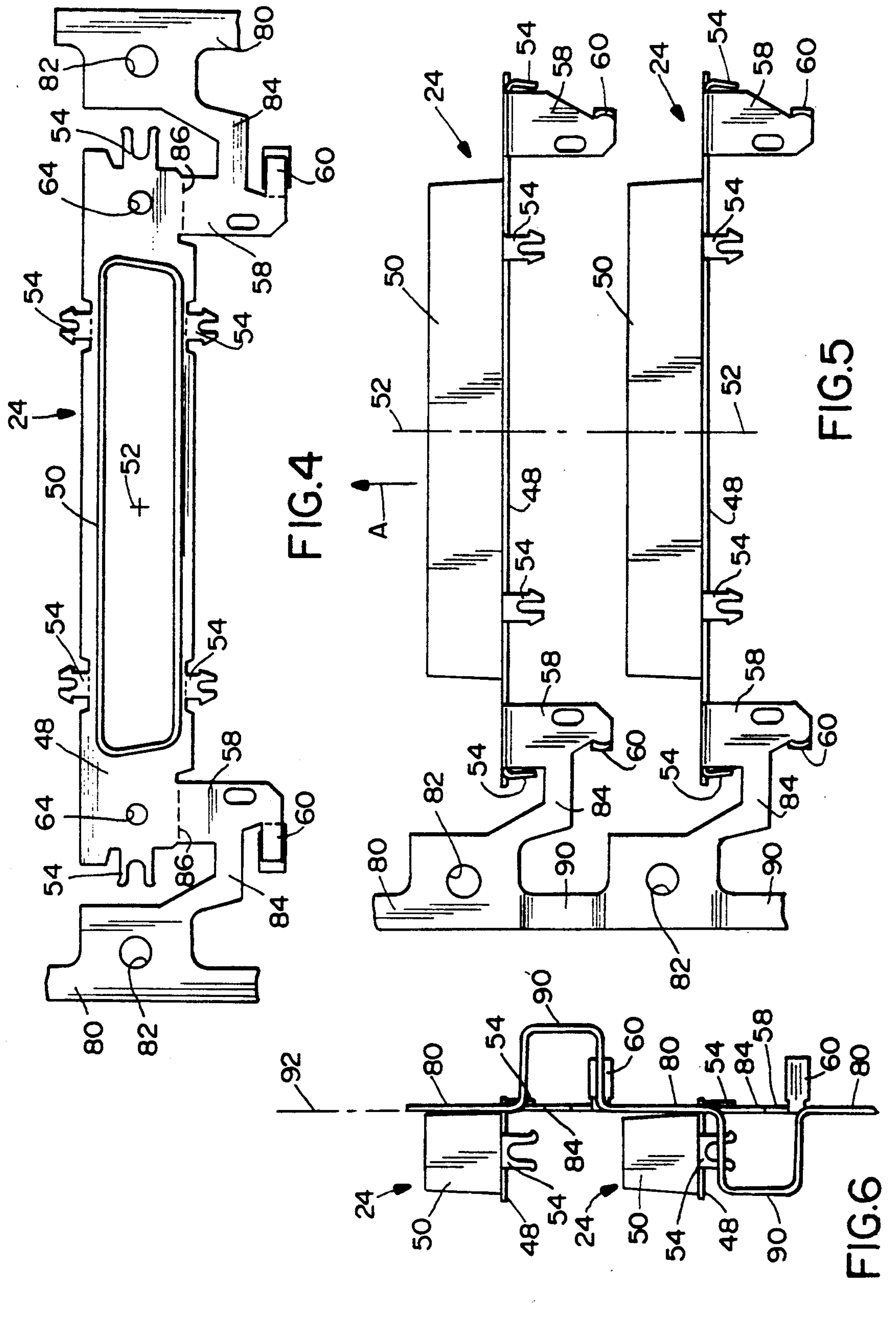
FIG. 4 is a fragmented plan view of the shield during an intermediate stamping and forming operation and extending between a pair of parallel carrier webs.
FIG. 5 is a fragmented plan view of a pair of shields and the carrier webs in their final stamped and formed configuration.
FIG. 6 is a fragmented side elevational view looking toward the right-hand side of FIG. 5.

Referring to FIGS. 3–5, the method and unique carrier web configuration of the invention now will be described in detail. Specifically, as depicted in FIG. 3, a strip-like sheet of conductive metal material 70 is fed from a supply roll 72 thereof into a stamping station or die 74. The stamping die is used to form shroud 50 of the shield, as seen to the left of the depiction, in a drawing operation. The sheet metal strip, designated **70*a* downline of the stamping station, with a series of drawn mating portions 50 seriatim lengthwise of the strip, then is fed onto a take-up reel 76**.

Take-up reel 76 is then utilized as a supply roll to feed metal strip **70*a*, with drawn mating portions 50, to a shell tapping and forming station 78 whereat the shield is tapped, stamped and formed into its ultimate configuration, as indicated at 24 to the left of the depiction, and wound onto another take-up reel 88**.

In addition, the tapping, stamping and forming station 78 may include a series of operations such as comparing FIGS. 4–6. Specifically, it can be seen in FIG. 4 that shield 24 extends between a pair of parallel carrier webs 80 having conventional indexing holes 82 spaced therealong, with the shield preliminarily stamped and joined to the carrier webs by attaching portions 84. Referring to FIG. 4, it can be seen that axis 52 of mating portion 50 extends perpendicularly to carrier webs 80, and that locking tabs 54 and ground tabs 60 still are in the plane of flange 48 (i.e. the tabs have yet to be bent or formed). In other words, flange 48, locking tabs 54, ground tabs 60 and apertures 64 have been stamped into their ultimate configurations but have yet to be formed into their precise orientations in the final shield configuration. It should be noted that grounding straps 58 are the portions of the shield which are attached to carrier webs 80 by web portions 84.

At tapping, stamping and forming station 78 (FIG. 3), the shields are then formed seriatim into their final configurations as shown in FIGS. 5 and 6. However, it should be noted in FIG. 5 that grounding straps 58 still are attached to carrier webs 80 by web portions 84. Flange 48 of the shield is bent perpendicularly to the grounding straps, as indicated by bend lines 86 in FIG. 4. This orients axis 52 of mating portions 50 in the direction of arrow "A" corresponding to arrows "A" in FIG. 3. Locking tabs 54 have been bent or formed perpendicular to plate 48, and ground tabs 60 have been bent or formed perpendicular to grounding straps 58. Referring back to FIG. 3, the composite of stamped and formed shields 24 and carrier strips 80 then are wound onto another take-up reel 88.

Reel 88 then is taken to a plating station 82 whereat the shields, still joined to carrier webs 80, can be plated and/or ground tabs 60 may be selectively plated with a highly conductive non-corrosive material such as a combination of tin and lead. It should be noted in FIG. 3 that axis 52 of shroud portion 50 of the shield shown at the left of the depiction is generally parallel to the direction of movement, as indicated by arrow "B", of the shields through plating station 82. This effects a relatively uniform plating of the shroud as the shield passes through the plating solution. In addition, it can be seen that ground tabs 60 project perpendicular to the direction of movement at the plating station whereby the ground tabs can be selectively plated.

After the plating operations, the composite of stamped, formed and plated shields 24 and carrier webs 80 are fed onto still another take-up reel 84. Reel 84 then is transported to and fed into an assembly machine 86 whereat the shields are severed from the carrier webs and assembled into or onto an electrical connector housing. In fact, the composite reel is considered a finished product in itself. Such reels can be sold to customers for in situ assembly into electrical connectors.

From the above description of FIG. 3 in conjunction with FIGS. 4 and 5, it can be understood that stamped and formed components of electrical connectors, such as shields 24, undergo a great deal of handling and transportation onto and off of various take-up reels and through various fabricating stations. During all of this manipulation, the various projecting portions of the shields are prone to become damaged or bent. In addition, it can be seen that a number of take-up reels are involved during a complete fabricating and assembly operation. Normally, a single strip of a plurality of shields and carrier webs are not continuously fed from station to station during complete fabrication of electrical connectors. Often, the reels are taken from one operation and placed in storage or inventory before being incorporated in another operation. For instance, reels of stamped and formed shields may be stored before taken to the plating station. The "plated" reels also may be stored before final assembly into electrical connectors. All of these reels take up a considerable amount of inventory space and it would be desirable to reduce the size of the reels. In addition, by reducing the spacing between adjacent shields, more shields can be stored on a reel which likewise reduce space.

Referring to FIGS. 5 and 6, many of the problems described above are solved by the unique forming of carrier webs 80 during the forming process. The carrier webs are formed into three-dimensional configurations so that the various projecting portions of the shields, such as ground tabs 60, are protected during the numerous fabricating and assembly operations on the shield. In addition, by forming the carrier webs into three-dimensional configurations, the length of the webs effectively is shortened which, in turn, reduces the spacing between the final stamped and formed shields, thereby resulting, in a greater number of shields on the take-up reel for use in processing operations as described in relation to FIG. 3. This provides a significant advantage especially during a plating operation. Typically, the completely formed shields on their carrier strips can only be fed through the various plating baths at a predetermined maximum speed measured in feet per minute. By reducing the spacing between adjacent shells, a greater number of shells can be plated per hour without increasing the speed of the carrier strips, thus reducing plating costs.

More particularly, as seen by the embodiment in FIGS. 5 and 6, particularly FIG. 6, each carrier web 80 is formed with U-shaped projecting portions 90 which alternate along the carrier webs so as to project from one side and then the other side of the original plane of the sheet metal material as indicated at 92. It can be seen that the only portions of shields 24 which remain in the original plane of the sheet metal material (i.e. at 70 in FIG. 3) are grounding straps 58. Mating portions 50 of the shields project from one side of the original plane of the sheet metal material and ground tabs 60 project from the other side of the original plane. The particular location of U-shaped portions 90 of the carrier webs, as well as the distance that the U-shaped portions extend away from original plane 52, can be selected as depending upon the configuration of the component which is being stamped and formed, such as the stamped and formed shields. Of course, other stamped or formed configurations of the carrier webs are contemplated, other than forming the U-shaped projections, in order to protect the various portions of the shields or other components and to shorten the distance between the components.

Figure 8:
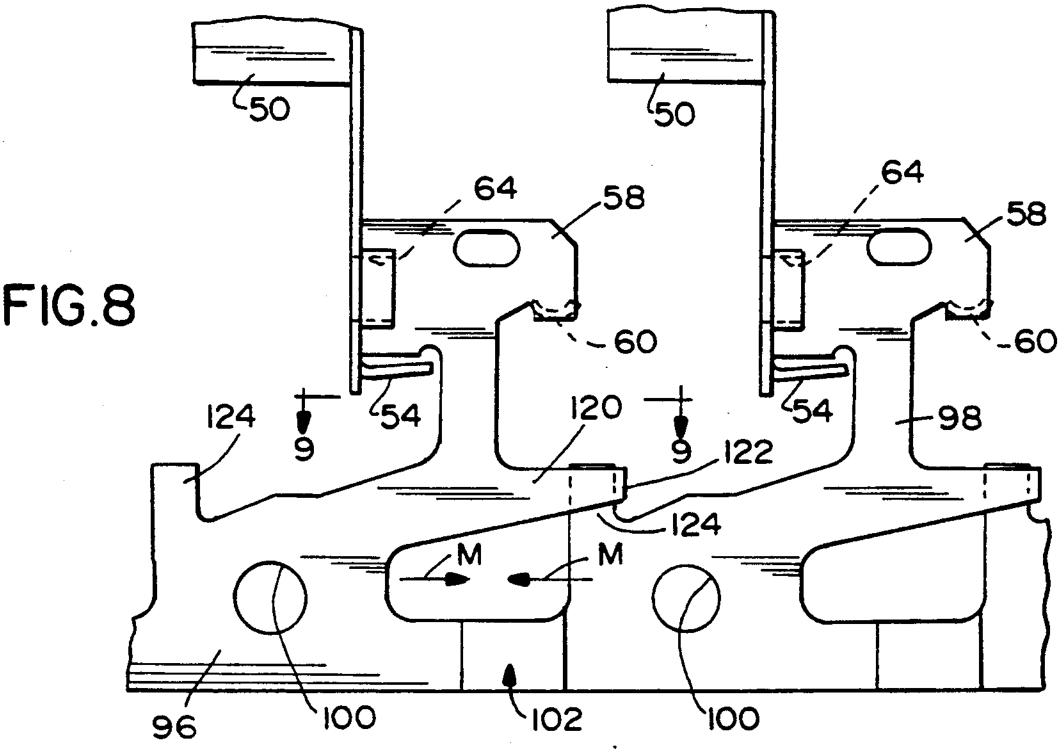
FIG. 8 is a fragmented top plan view looking down onto FIG. 7.
Figure 7:
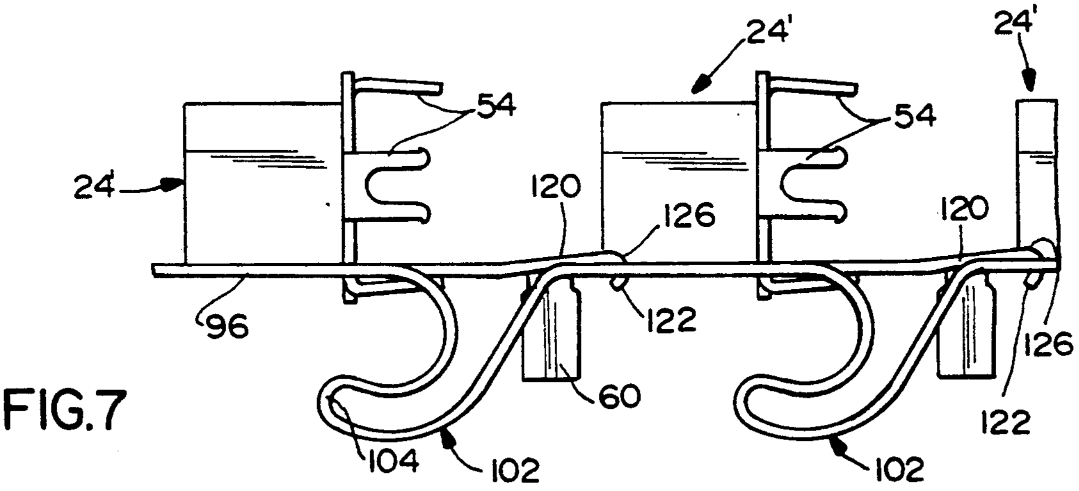
FIG. 7 is a fragmented side elevational view similar to that of FIG. 6, but of an alternative embodiment of the invention.
Figure 9:
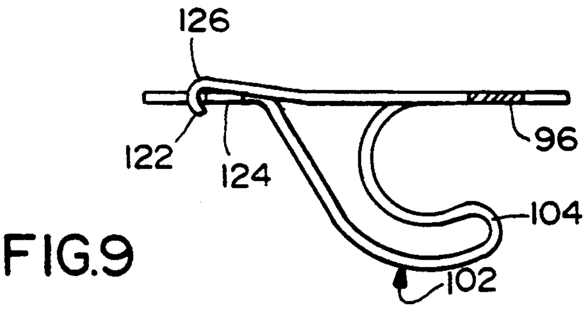
FIG. 9 is a fragmented section taken generally along line 9—9 of FIG. 8.

Referring to the embodiment of the invention shown in FIGS. 7-12, and first to FIGS. 7-9, a plurality of shields, generally designated 24', are stamped and formed in a continuous manufacturing process by using carrier webs 96, with the shields joined to the carrier webs by web portions 98, similar to the continuous manufacturing process described above in relation to FIGS. 3-6. Again, conventional indexing holes 100 are space along carrier web 96 as shown in FIG. 8. Although shown being joined by a pair of carrier webs 96, metal components could be joined by one or more carrier webs as is known in the art.

In this embodiment, as best shown in FIGS. 7-9, each carrier web 96 is formed with protecting portions, generally designated 102, which project from only one side of the carrier web and which protect ground tabs 60 of shields 24'. The protecting portions extend away from the carrier web at least a distance equal to the length of the ground tabs 60. In comparison to the U-shaped projections 90 of the embodiment of the invention shown in FIGS. 4-6, protecting portions 102 are formed in an arc-shape from the original plane of the sheet metal material. In essence, the arc-shaped protecting portions 102 define a wave configuration having a closed end 104. Such wave configuration includes an inner arcuate leg and an outer arcuate leg with a bight therebetween. Each of the arcuate legs are arcuate throughout at least a substantial portion of the length thereof. Not only do the arc-shaped projections protect ground tabs 60, but the length of the composite carrier web and formed shields is reduced, as described above.

Referring to FIGS. 11 and 12 in conjunction with FIGS. 7-10, a method of forming arc-shaped protecting portions 102 is illustrated somewhat diagrammatically. In FIG. 12A, carrier web 96 is shown as in the original plane of the sheet metal material. As best seen in FIG. 11, a rotatable mandrel carrier, generally designated 106, is positioned at opposite sides of the sheet metal material. A cam 107 within the tooling is operatively associated with each mandrel carrier 106 to selectively permit movement of the mandrel carrier towards and into engagement with web 96. Pneumatic cylinder 111 is provided to rotate the mandrel carrier about axis 107 in the direction of arrow "X". The mandrel carrier has a cylindrical first mandrel 108 which rotates concentrically about second mandrel 110. In essence, the second mandrel acts as an anvil about which rotating first mandrel 108 of the mandrel carrier 106 moves. Although depicted as being cylindrical, mandrels 108 and 110 are actually slightly tapered or frusto-conical to permit them to move towards and easily engage web 96. Other means for moving the various components could be utilized.

Figure 12A:
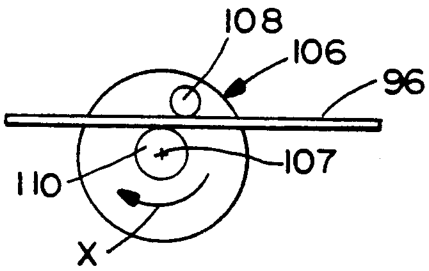
FIG. 12 is a diagrammatical illustration of some of the steps involved in fabricating the embodiment illustrated in FIGS. 7–10.
Figure 12B:
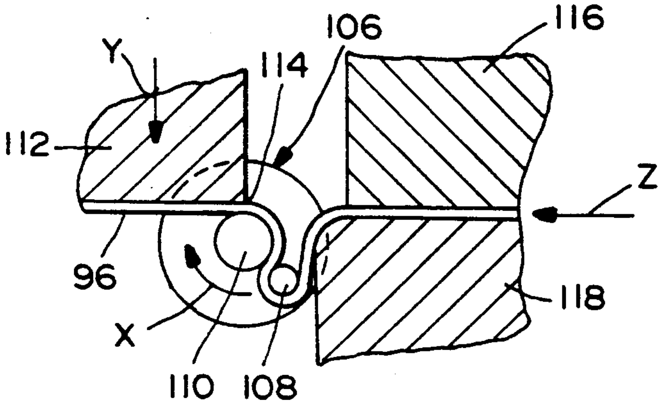

FIG. 12B shows that first mandrel 108 has moved into and through carrier web 96 to begin forming an arc-shaped configuration about second mandrel 110, again in the direction of arrow "X". This depiction also shows a clamping member 112 which applies a pressure in the direction of arrow "Y" against carrier web 96, whereby the web is confined in a nip 114 between the clamping member and second mandrel 110. A pair of upper and lower guiding members 116 and 118, respectively, sandwich carrier web 96 therebetween on the side of the rotating mandrel diametrically opposite clamping member 112. These guiding members do not clamp the carrier web but guide or confine the carrier web 96 as it moves in the direction of arrow "Z" as first mandrel 108 of mandrel carrier 106 moves into the sheet metal material of the carrier web.

Figure 12C:
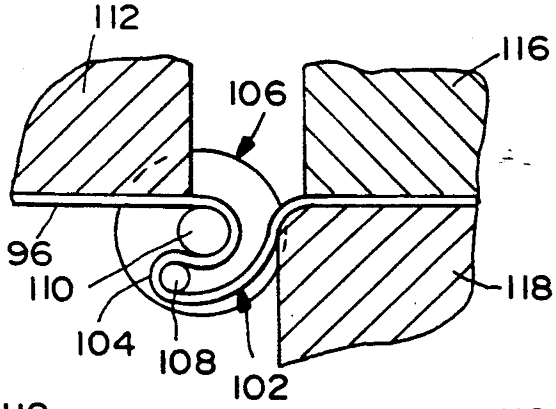

FIG. 12C shows the first mandrel 108 of mandrel carrier 106 having moved approximately 180° from its position in FIG. 12A, to form protecting portion 102 into its closed-ended wave configuration as shown in FIGS. 7 and 9.

Figure 12D:
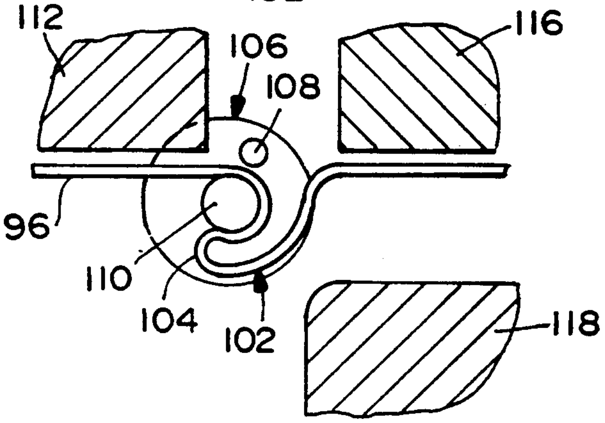

FIG. 12D shows mandrel carrier 106 having been rotated back to its original position as shown in FIG. 12A, retracting first mandrel 108 out of the now formed arc-shaped protecting portion 102. Clamping member 112 and confining members 116 and 118 also have been retracted to allow carrier web 96 to be fed through the die apparatus. The cam 109 used to move mandrel carrier 106 into contact with web 96 is then retracted which moves the mandrel back to its original position out of engagement with web 96.

The wave-shape projections 102 and process of FIGS. 7-12 have a number of advantages over the U-shaped projections 90 in FIGS. 4-6 with respect to the manufacture thereof. The U-shaped projections require many forming operations in order to fully form the U-shape. As a result, the die in which the U-shape is formed must include additional "stations" for forming the U-shape gradually in order to avoid stretching the metal. The wave-shape, on the other hand, is formed at one "station" and therefore not as many stations are required and the die can be less complex. In addition, because the wave-shape does not stretch the metal, the centerline spacing between adjacent components can be precisely maintained.

Another feature of the invention is shown in the embodiment illustrated in FIGS. 7-10 and includes a latch member for holding the stamped and formed carrier web in its formed configuration as shown in FIGS. 7-9. Once the carrier web has been formed with its wave-configured protecting portions 102, as described above, (or the U-shaped members 90 of FIGS. 5 and 6) and the composite carrier web and shields are to be wound onto a reel for subsequent manufacturing operations, there is a tendency for the carrier web to elongate in response to any linear forces in the direction of the plane of the carrier web. This could result from simple winding forces or as the shields are pulled through various processes such as plating or automated assembly. This not only would increase the spacing between shields but such increase would typically not be uniform between all shields due to differing characteristics within the metal sheet. As a result, subsequent automated assembly of connectors with the shields would be more complex because the spacing between shields would not be uniform.

Figure 10:
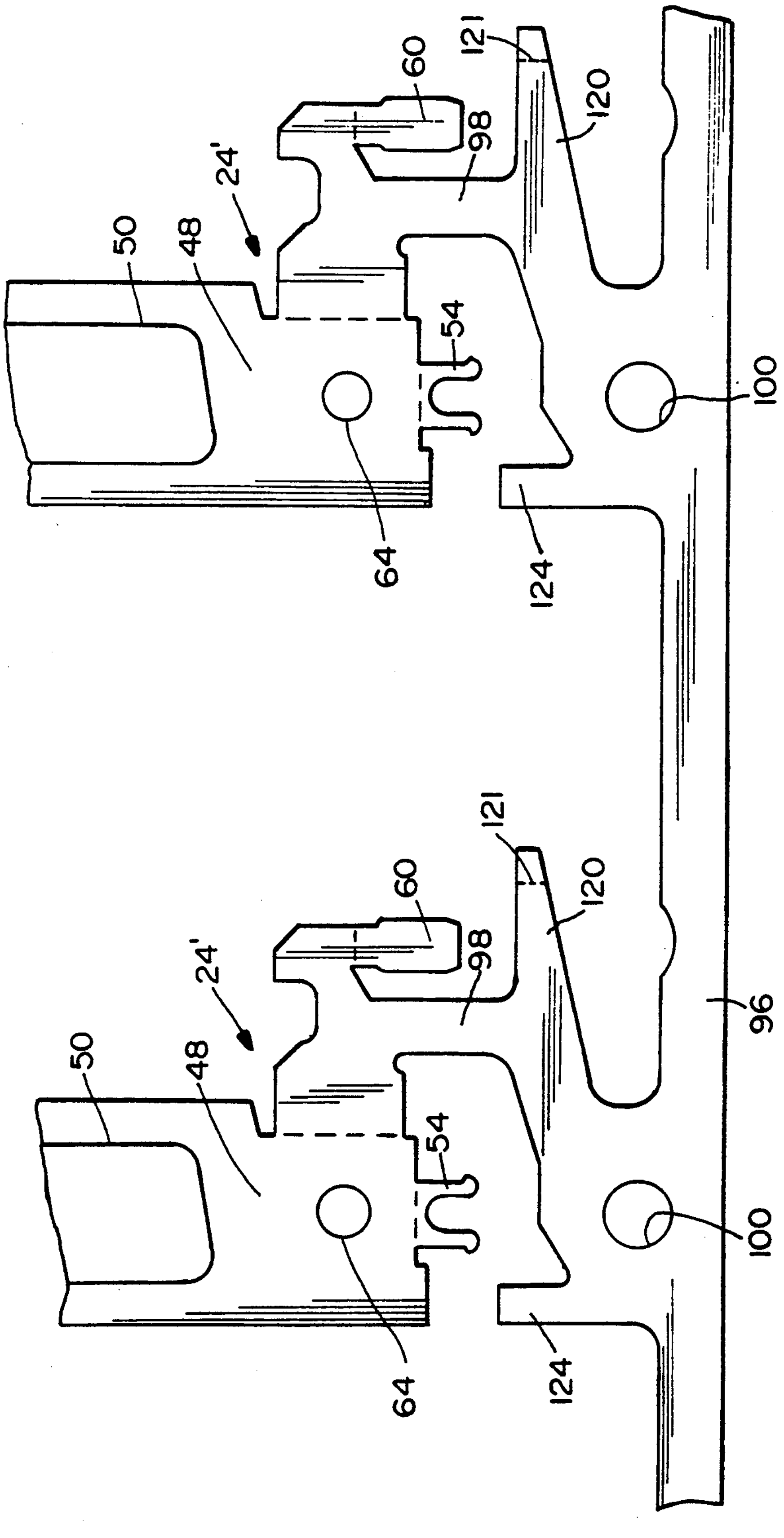
FIG. 10 is a fragmented plan view of a blank from which the embodiment of FIGS. 7–9 is fabricated.

FIG. 10 shows a fragmented portion of a blank from which carrier web 96, shield 24', ground tab 60, latch arm 120 and latch keeper 125 are stamped to illustrate the location of the latch arm and the latch keeper of an adjacent shield when initially stamped from the sheet metal material. It can be seen that the latch arm 120 and hook portion 122 will latch with the latch keeper 124 associated with the adjacent shield. Comparing FIGS. 7 and 10 shows that the spacing between adjacent shells is reduced almost in half from the initial stamped spacing of FIG. 10 to the final stamped and formed spacing of FIG. 7.

As seen in FIGS. 7-10, a latch arm 120 is stamped out of the original sheet metal material and is formed with a latch hook 122 on the distal end thereof by bending latch arm 120 along line 121 (FIG. 10). A latch keeper 124 is formed from the carrier web to project inwardly in the path of hook portion 122 of latch arm 120. These operations can occur at any time during the stamping and forming of the shield.

When rotating mandrel 106 moves rotating forming portion 108 into the sheet metal material as described above in relation to FIGS. 11 and 12, the sheet metal portions of the carrier web on opposite sides of the rotating forming portion will move toward each other on opposite sides of wave-configured protecting portions 102, as indicated by opposing arrows "M" in FIG. 8. Latch arm 120 (along with hook 122) and latch keeper 124 are sized and configured whereby hook portion 122 will snap over the latch keeper at a point when rotating forming portion 108 reaches its completed forming position in FIG. 12C. To this end, it can be seen in FIGS. 7 and 9, that the "forward" surface 126 of hook portion 122 is shaped rounded so that the latch arm and hook portion will ride over latch keeper 124 as the wave-shaped portion 102 is formed and snap into latching engagement when the wave configured protecting portion is fully formed.

An alternative to utilizing the latch arm 120 and latch keeper 124 is to overlap the sheet metal material and joining such overlapped material by deformation, staking, welding or other known manners of joining sheet metal material. A further alternative would be to use the latch arm 120 and latch keeper 124 as described above together with such an additional joining step. This would provide even greater resistance to stretching of the carrier strip.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A continuous carrier means of sheet metal material for carrying a plurality of components of an electrical connector through various manufacturing processes, each component ultimately being formed into a three-dimensional configuration and retained on said carrier means with a predetermined distance between adjacent components, said carrier means including at least one carrier web member extending between adjacent components, said web member including a three-dimensional pitch reducing section for reducing the distance between adjacent components, at least a portion of said pitch reducing section being formed out of the original plane of said sheet metal material, wherein the improvement comprises:

said carrier web member further including retaining means separate from said pitch reducing section and integrally formed with said carrier means to resist expansion of said predetermined distance between adjacent components.

2. The continuous carrier means of claim 1 wherein said retaining means includes a hook member connected to said carrier web means adjacent a first component and a hook receiving portion formed adjacent a second component, said first and second components being adjacent each other, whereby said hook member latches with said hook receiving portion upon the formation of said pitch reducing section.

3. The continuous carrier means of claim 2 wherein said pitch reducing section has a continuous arc-shaped structure extending out of the original plane of said sheet metal material.

4. The continuous carrier means of claim 3 wherein said continuous arc-shaped structure includes first and second arcuate legs with a bight therebetween, said first and second arcuate legs being concentric.

5. The continuous carrier means of claim 4 wherein said first arcuate leg has a first radius and said second arcuate leg has a second radius, said first radius being less than said second radius.

6. The continuous carrier means of claim 1 wherein said components are shields for electrical connectors, said shields having a generally hollow open-ended shroud portion defining an axis therethrough, the continuous carrier means carrying the shields in a given direction through the manufacturing processes, and the shroud portion of the shields being oriented with the axis thereof in said given direction whereby the continuous carrier means can be used to carry the shields through a plating solution relatively flowing through the open ends of the shroud portion of the shield.

7. The continuous carrier means of claim 6 wherein said three-dimensional pitch reducing section projects from the original plane of the sheet metal material a sufficient distance to protect portions of the shield during subsequent manufacturing operations with the shield.

8. The continuous carrier means of claim 6 wherein said shield further includes flange means, said shroud portion extending away from said flange means in a direction parallel to said axis, and at least one ground strap projecting from said flange means in a direction opposite said shroud portion.

9. The continuous carrier means of claim 8 further including a ground tab projecting from said ground strap perpendicular to said axis, said ground tab being insertable into a circuit board.

10. The continuous carrier means of claim 9 wherein said three-dimensional pitch reducing section projects from the original plane of the sheet metal material a sufficient distance to protect said ground tab during subsequent manufacturing operations with the shield.

11. A continuous carrier web means of sheet metal material for carrying a plurality of components of an electrical connector through various manufacturing processes, each component ultimately being formed into a three-dimensional configuration and retained on said carrier web means with a predetermined distance between adjacent components, said carrier web means including at least one three-dimensional pitch reducing section positioned between adjacent components on said web means for reducing the distance between adjacent components, wherein the improvement comprises:

said pitch reducing section having a continuous arc-shaped structure extending out of the original plane of said sheet metal material, said continuous arc-shaped structure including first and second arcuate legs with a bight therebetween, each of said first and second arcuate legs being arcuate throughout at least a substantial portion of the length thereof.

12. The continuous carrier web means of claim 11, including retaining means integrally formed with the sheet metal material for holding the carrier web means in its three-dimensional configuration to resist altering the distance between adjacent components due to axial forces exerted on the carrier web means.

13. The continuous carrier web means of claim 12, wherein said arc-shaped portion is closed-ended in a wave configuration.

14. The continuous carrier web means of claim 11 wherein said first arcuate leg has a first radius and said second arcuate leg has a second radius, said first radius being less than said second radius.

15. The continuous carrier web means of claim 13 wherein said retaining means includes latch means integrally formed with said carrier web means during the forming of said arc-shaped structure to resist subsequent expansion of the predetermined distance between adjacent components.

16. The continuous carrier web means of claim 15 wherein said latch means includes a hook member connected to said carrier web means adjacent a first component and a hook receiving portion formed adjacent a second component, said first and second components being adjacent each other, whereby said hook member latches with said hook receiving portion.

17. A continuous carrier web means of sheet metal material for carrying a plurality of shields for electrical connectors through various fabricating processes, each shield having a generally hollow open-ended shroud portion defining an axis therethrough, said shroud portion adapted to receive an electrical connector inserted therein in a direction parallel to said axis, the continuous carrier web means being joined to the shield, for carrying the shield in a given direction parallel to said axis through the fabricating processes, and the shroud portion of the shield being oriented with the axis thereof in said given direction whereby the continuous carrier web means can be used to carry the shield through a plating solution flowing relatively through the open ends of the shroud portion of the shield.

18. The continuous carrier web means of claim 17, wherein said shield includes ground lugs thereon and said continuous carrier web means has a three-dimensional configuration with at least a portion of the web means projecting from the original plane of the sheet metal material a sufficient distance to protect the ground lugs during subsequent fabricating operations on the shield.

19. The continuous carrier web means of claim 17 wherein said shield includes ground straps extending from a flange portion from which said shroud portion projects, each said shield being attached to said continuous carrier web means at said ground straps, said ground straps being in the same plane as the original plane of the sheet metal material.

20. A method of stamping and forming from sheet metal material a plurality of three-dimensional components for electrical connectors, the components being carried through the stamping and forming process by a continuous web means of the sheet metal material, comprising the steps of:

providing a sheet of sheet metal material;

stamping and forming the components from the sheet metal material such that at least a portion of each component projects from one side of the original plane of the sheet metal material;

forming a portion of the web means between adjacent components into a three dimensional pitch reducing configuration for reducing the distance between adjacent components to a predetermined distance; and providing retaining means separate from said pitch reducing configuration and integral with said sheet metal material to resist subsequent expansion of the predetermined distance between adjacent components.

21. The method of claim 20 wherein said step of forming a portion of the web means into a pitch -reducing configuration causes said retaining means to latch said sheet metal material and maintain adjacent components said predetermined distance apart.

22. The method of claim 20 wherein said retaining means includes a hook member connected to said web means adjacent a first component and a hook receiving portion adjacent a second component, said first and second components being adjacent each other, and said step of forming said three dimensional pitch reducing configuration causes said hook member to latch said hook receiving portion.

23. The method of claim 22 further comprising the step of deforming said hook member and said hook receiving portion after said hook member latches said hook receiving portion.

24. The method of claim 20 wherein said pitch reducing configuration is formed in an arc-shape from the original plane of the sheet metal material.

25. The method of claim 24 wherein said pitch reducing configuration is formed by engaging said portion of the web means with a mandrel that is rotated into the sheet metal material to form a closed-ended wave configuration.

26. The method of claim 25 wherein said pitch reducing configuration is formed by engaging said portion of the web means with a pair of mandrels and rotating at least one of said mandrels relative to the original plane of the sheet metal material.

27. The method of claim wherein said three-dimensional components are shields for electrical connectors, said shields having portions thereof projecting from the original plane of the sheet metal material and said pitch reducing configuration is formed of a dimension so as to protect said projecting portions of said shield.

28. A continuous carrier means of sheet metal material for carrying a plurality of components of an electrical connector through various manufacturing processes, each component ultimately being formed into a three-dimensional configuration and retained on said carrier means with a predetermined distance between adjacent components, said carrier means including at least one carrier web member extending between adjacent components, said web member including a three-dimensional pitch reducing section for reducing the distance between adjacent components, at least a portion of said pitch reducing section being formed out of the original plane of said sheet metal material, wherein the improvement comprises:

said carrier web member further including retaining means integrally formed with said carrier means to resist expansion of said predetermined distance between adjacent components, said retaining means including a hook member adjacent a first component and a hook receiving portion adjacent a second component, said first and second components being adjacent each other, and said hook member latchingly engages said hook receiving portion.

29. A method of stamping and forming from sheet metal material a plurality of three-dimensional components for electrical connectors, the components being carried through the stamping and forming process by a continuous web means of the sheet metal material, comprising the steps of:

providing a sheet of sheet metal material;

stamping and forming the components from the sheet metal material such that at least a portion of each component projects from one side of the original plane of the sheet metal material; and forming a portion of the web means between adjacent components into a three dimensional pitch reducing configuration for reducing the distance between adjacent components to a predetermined distance;

wherein the improvement in forming said pitch reducing configuration comprises:

engaging said portion of the web means with a forming member and rotating said forming member into the sheet metal material to form a closed-ended wave configuration comprising first and second arcuate legs which are arcuate throughout at least a substantial portion of the length thereof.

30. The method of claim 29 wherein said pitch reducing configuration is formed by engaging said portion of the web means with a pair of forming members and rotating at least one of said forming members relative to the original plane of the sheet metal material.

* * * * *